Oct. 2, 1973   M. P. GROTHEER   3,763,083
CONSTRUCTION MATERIALS
Filed June 8, 1971   2 Sheets-Sheet 1

United States Patent Office 3,763,083
Patented Oct. 2, 1973

3,763,083
CONSTRUCTION MATERIALS
Morris P. Grotheer, Lewiston, N.Y., assignor to Hooker Chemical Corporation, Niagara Falls, N.Y.
Continuation-in-part of abandoned application Ser. No. 750,959, Aug. 7, 1968. This application June 8, 1971, Ser. No. 150,926
Int. Cl. C08g 51/04
U.S. Cl. 260—40 R     14 Claims

ABSTRACT OF THE DISCLOSURE

Unsaturated polyester resins derived from an unsaturated dicarboxllic acid, a lower alkylene neo-glycol and a component of the formula

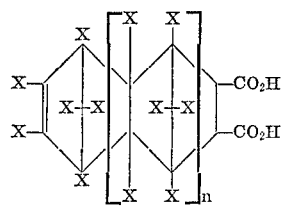

wherein X is a halogen and $n$ is the number of repeating units of hexahalocyclopentadiene present in the Diels-Alder adduct forms corrosive resistant concretes when cross-linked in the presence of an aggregate. The concrete type products contain up to 90 percent of weight aggregate and optimally from 10 to 40 percent of the polyester resin. The concrete products exhibit outstanding properties as construction materials for use in acid environs and, depending upon the specific use, may contain additional adjuvants such as dyes, pigments, anti-foulant additives, biocidal agents, waxes and the like. Chlor-alkali electrolytic cell parts constructed from the preferred resin derived from the Diels-Alder adduct of hexahalocyclopentadiene and maleic acid or anhydride are not attacked by hot wet chlorine or brine over extended periods of time in comparison to normal concrete. Likewise, saline solutions, acidic sewer contents and the like are not relatively corrosive toward these construction materials.

This is a continuation-in-part application of copending appliction Ser. No. 750,959, filed Aug. 7, 1968, now abandoned.

BACKGROUND OF THE INVENTION

Acidic materials present unique problems in developing construction materials for their containment. Concrete provides a very suitable outer construction material for large tanks and pipes because of its inherent strength, both tensile and compressive, as well as its heat resisting properties involving temperatures up to and above the boiling point of contained materials. In order to reduce the thickness of concrete structures, metal reinforcement has been generally used. Reinforced concrete is usually of sufficient thickness to provide an appreciable thermal barrier, so that the external surface of a container for hot fluids is comparatively cool.

In certain special applications, chemically resistant liners for concrete are required. Among various liners which may be applicable in a special problem are chemically resistant asphalt, soft rubber and ebonite, synthetic rubber liners and synthetic resin liners in both plasticized and non-plasticized form.

One problem presented by liners for concrete tanks is that of attack by the corrosive material within the tank upon a liner constituent such as a plasticizer, and upon the concrete of the tank via seepage through openings in the liner created by expansion and contraction during wide temperature changes of the container fluid.

In various applications, the production of liners for concrete vessels poses a unique problem in itself. This is especially true where concrete vessels of complex and irregular shapes are involved. For example, a liner for an electrolytic cell top is much more difficult to produce than a liner for a conventional storage tank for corrosive materials.

Another problem encountered with concrete structures is that of fouling. For example, in marine applications, where a concrete structure is exposed to salt water or other corrosive aqueous bodies of water, such as concrete installations for desalination plants, ships hulls and concrete conduits for pumping installations, aquatic plant and animal life may foul conventional concrete structures and limit is functional capacity. Thus, barnacles, oysters, clams, seaweed, algae and the like find concrete structures suitable for anchoring and colonization.

BRIEF DESCRIPTION OF THE INVENTION

In accordance with this invention, there is provided a construction material especially adapted for use in conjunction with highly corrosive materials, which may be produced from a synthetic polyester resin highly filled with aggregate. The polyester aggregate compositions are characterized by their strength, durability and corrosion resistance toward such highly corrosive substances as acidic electrolytes, salt water, sewage, and pickling and plating solutions.

In most applications, the construction material of this invention is self-supporting and the need for reinforcing material such as steel cables or fiber glass reinforcement is unnecessary. However, the use of reinforcing members alone or in prestressed or poststressed form does not depart from the intended scope of this invention. The construction material of this invention may be used as the sole material of construction in many instances such as in the construction of electrolytic cell boxes, sewer pipes, and corrosion resistant tanks. Through the development of the polyester-aggregate compositions of this invention, it is generally possible to construct electrolytic cell parts and corrosion resistant tanks without using a separate internal liner as is conventional practice with concrete, wood, and metal vessels. However, the material of this invention may also be employed as a lining for other construction materials such as wood, concrete or steel if desired.

DETAILED DESCRIPTION OF THE INVENTION

In accordance with the instance invention, there is provided polyester resin-aggregate compositions comprising (A) about 10 to 40 percent by weight of a mixture of (1) an unsaturated polyester resin of components comprising an unsaturated dicarboxylic acid and a lower alkylene neo-glycol, and a component of the formula

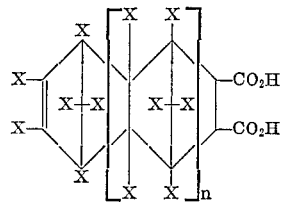

wherein $n$ is from 0 to 5 and X is a halogen selected from the group consisting of chlorine and bromine and (2) an unsaturated cross-linking agent and (B) from 60 to 90 percent by weight of aggregate.

More specifically, the unsaturated polyester resin employed in the instant invention is the reaction product of a lower alkylene neo-glycol and a lower alkenylene dicarboxylic acid, such as maleic, fumaric and itaconic acid, or chlorendic acid, each acid being used individually or in admixture with each other. Likewise, the lower alkenylene dicarboxylic acid or chlorendic acid may be employed in admixture with isophthalic acid to produce an unsaturated polyester resin with the lower alkylene neo-glycol. Chlorendic acid and its hexahalocyclopentadiene adduct analogues may be employed to produce highly desirable unsaturated polyester resins for the present invention by polymerization with dihydroxy substituted lower alkanes, either alone or upon admixture with a lower alkenylene dicarboxylic acid.

The lower alkylene neo-glycols employed in the production of the polyester resins may be those known to the art. Generally, neo-diols of from five to twelve carbon atoms, are suitable. More specifically, lower alkylene neo-diols and lower alkylidene diols of from five to twelve carbon atoms may be employed to produce the desired polyester resins. The neo-glycols have the following general formula

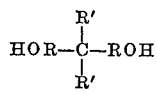

wherein R is independently selected from the group consisting of alkylene and alkenylene groups of one to four carbon atoms and R' is selected from the group consisting of alkyl, hydroxy alkylene, chloralkylene, or alkenylene groups of one to five carbon atoms, with the proviso that (1) The sum of the carbon atoms in the R and R' groups is at least four but not more than eleven.

Examples of the neo glycols which are useful in this invention include the following:

neopentyl glycol
2,2,4-trimethyl-1,3-pentane diol
2,2,4,4-tetramethyl-1,3-cyclobutane diol
2-butyl-2-ethyl-1,3-propane diol
2-butyl-2-isopropyl-1,3-propane diol
2-chloromethyl-2-ethyl-1,3-propane diol
2,2-diallyl-1,3-propane diol
2,2-diethyl-1,3-propane diol
2-ethyl-2-(hydroxymethyl)-1,3-propane diol (trimethylol propane)
2-isopropyl-2-methyl-1,4-butane diol
2,2-diethyl-1,3-butane diol
2,2-dimethyl-1,3-hexane diol
2-ethyl-2,4-dimethyl-1,3-hexane diol
2,2-dimethyl-1,6-hexane diol
2,2,4-trimethyl-1,6-hexane diol The preferred glycols are those containing from five to eight carbon atoms, and especially neopentyl glycol, 2,2,4-trimethyl-1,3-pentane diol. These glycols may be employed as mixtures to produce polyester resins with desirable properties. As useful herein the term "neo-glycol" is intended to define diols which contain at least one carbon atom which is directly connected to four other carbon atoms, as in

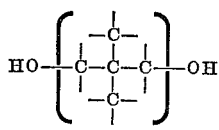

The dicarboxylic acid reactant from which the unsaturated polyester resins are derived may be employed in the free acid form or in any equivalent form such as the anhydride, acid halide or lower alkylester. Therefore, throughout this disclosure, it is to be understood that reference to the dicarboxylic acid reactant is intended to embrace the correspondingly operable functional derivative.

Therefore, the instant invention affords compositions of matter comprising from about 10 to 40 percent, and preferably 10 to 20 percent of (A) an unsaturated polyester derived from
 (1) at least one alcohol selected from the group consisting of lower alkylene neo-glycols having from five to twelve carbon atoms, and preferably having from five to eight carbon atoms,
 (2) at least one carboxylic acid selected from the group consisting of a lower alkenylene dicarboxylic acid, and a compound of the formula

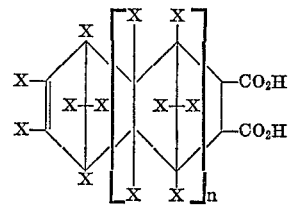

wherein X is a halogen selected from the group consisting of chlorine and bromine and $n$ is from 0 to 5,
 (3) cross-linked with an unsaturated, cross-linking agent, and
(B) from 60 to 90 percent, and preferably 80 to 90 percent by weight of an aggregate.

The synthetic polyester resins which have been discovered to be particularly suited for the preparation of construction materials for ultimate use in highly corrosive environs are unsaturated, thermosetting polyesters. These resins are readily cross-linked with agents containing vinyl unsaturation in the presence of free radical generators which are well known in the art and generally grouped as, peroxides, azo-compounds, high energy radiation and the like.

The polyester resin in the presence of a vinyl unsaturated cross-linking agent is mixed with an aggregate to afford a mixture in which preferably from 10 to 20 percent by weight of the ultimate product is the cured resin whereas the remainder of the composition is aggregate. The size distribution of the aggregate is generally that ideally employed in the preparation of concrete with cement. That is, generally, the maximum aggregate particle size is that of approximately one half of the thickness of the object to be constructed and the aggregate size distribution is substantially that set forth by the Fuller-Thompson maximum density theory as applied to concrete. With the resin bound concretes of this invention, aggregate fines—that is, particles which will pass a 50 mesh screen, should not be excessive. Although amounts of such aggregate fines are acceptable, their presence alters the physical strength of the final product slightly. A good working limitation upon the amount of aggregate fines is such that less than two percent of the aggregate is smaller than 0.0116 inch in diameter.

A free radical generator is employed to initiate the reaction between the unsaturated polyester resin and the unsaturated cross-linking agent in the presence of the aggregate. Proper temperature control to achieve the optimum curing condition is related to the strength of the ultimate concrete product and the curing conditions may be controlled by methods known in the resin art. Generally, the polyester resin-aggregate compositions of this invention reach their service strength in about 1 to 2 days as compared to concrete which requires about 28 days to reach its service strength even when subjected to a wet cure.

The preferred polyester resins, especially noteworthy because the concrete produced from them is resistant to corrosion under very severe conditions such as is encountered within a chloralkali electrolytic cell, are copolymers containing the approximate mole fractions of groups derived from the reactants as follows:

| Reactant: | Mole fraction of resin |
|---|---|
| (I) Chlorendic acid (or anhydride) | 0.15–0.35 |
| (II) Fumaric acid or maleic acid (or anhydride) | 0.20–0.35 |
| (III) Diol (neopentyl glycol or 2,2,4-trimethyl-1,3-pentane diol) | 0.35–0.60 |

A cross-linking agent is combined with the polyester resin in an amount of about 25 to 50 parts per hundred of the uncured resin. The cross-linking agent may be any of those reagents known to the art which contain vinyl unsaturation such as styrene, diallylphthalate, diallylisophthalate, triallylcyanurate, acrylic acid, methacrylic acid, methyl methacrylate, vinyltoluene, o- and p-, mono- and dichlorostyrene, alpha-methylstyrene, diallyl bicyclo (2.2.1)-hept-5-ene-2,3-dicarboxylate, and the like. For practical purposes, styrene is the preferred cross-linking agent and it is conveniently added in an amount of about 45 to 55 parts per hundred of uncured resin. If it is desired to employ the unsaturated polyester resin in thixotropic form, those agents known to the art for producing a thixotropic resin may be added to the resin, such as $SiO_2$ for example. With the addition of a thixotropic agent, additional cross-linking agent is added, and the total cross-linking agent content may be up to about 70 parts per hundred of the uncured resin.

The most preferred polyester resins, because of their outstanding resistance toward corrosion when exposed to acidic materials are prepared by the methods set forth in the references cited and contain the following components in the indicated mole ratios.

RESIN A

The polyester resin comprised of about 0.5 mole fraction of chlorendic acid and maleic anhydride and about 0.5 mole fraction neopentyl glycol, in about 45 parts of styrene per hundred parts of resin.

RESIN B

A thixotropic form of Resin A which contains from about 0.5 to 3.5 percent $SiO_2$ incorporated into the resin with the addition of more styrene.

The unsaturated polyester resin in admixture with a crosslinking agent is mixed with aggregate and polymerized in the presence of a free radical initiator such as benzoyl peroxide, acetyl peroxide, lauroyl peroxide, methyl ethyl ketone peroxide, cumene hydroperoxide, t-butyl peroxide and the like. The peroxide catalyst is usually present in a proportion approximating between 0.01 and 10 percent depending on the efficiency of their action.

The aggregate employed to make up or fill from 80 to 90 percent by weight of the polyester resin aggregate concrete may be varied to afford the most resistant matrix toward the type of corrosive material for which the concrete is designed to be used. For example, in certain applications where resistance to corrosion by acidic materials such as hot wet chlorine is involved, it is desirable to employ as aggregate, a material which is acid resistant and substantially siliceous in nature such as quartzite, granite, flint, mica, chert, or other highly insoluble silicates.

The polyester resin-aggregate concrete type product of this invention is produced generally in the same manner as concrete is produced with cement. The aggregate is placed in a mixer and the resin, catalyst and other liquid ingredients are separately combined, added to the aggregate and the mixture is thoroughly mixed. The pot life of the mixture may be controlled to a limited degree by varying the amounts of polymerization catalyst employed. A pot life of from 4 to 6 hours appears to be about optimum from the standpoint of reaching the peak isotherm for the resin while affording a sufficient setting time for the resin to cure when exposed to air. Surface active agents such as Triton® X–102 or X–100 (an alkyl phenoxy polyethoxyethanol) may be added to improve the mixing properties of the resin and aggregate. However, the compressive strength of the final material may be affected by the addition of a surface active agent. Likewise, the moisture content of the resin aggregate mixture is of significance to the final compressive strength of the material. However, since no special precautions need be taken to limit the moisture content of the aggregate other than to house it away from the natural elements, the moisture content is easily maintained within acceptable ranges. The presence of moisture in excess of one percent will lower the compressive strength of the final product, a moisture content in the range of 0 to 4 percent is acceptable and in the range of 0.5 to 1.5 percent moisture actually assists in the compacting of the mix.

Although the polyester resin-aggregate compositions of this invention are naturally resistant toward the growth of marine plant and animal life, they may be made more resistant through the addition of anti-foulant and biocidal agents which are known to the art such as additives used in antifouling paints. For example, those antifoulant additives disclosed by Preuss, Metal Finishing, March 1966, pp. 61–63 and April 1966, pp. 63–66 as well as Burns et al. Protective Coatings for Metals, 3rd ed., A.C.S. Monograph No. 163. Reinhold Press (1967), pp. 541–542, are applicable anti-foulant additives. Similarly dyes, pigments, waxes and biocidal agents may be added to the disclosed polyester resin-aggregate compositions to impart desired physical and chemical properties such as color, heat absorption or reflection and toxicity. These various additives may be applied to structures produced from the concrete type products of this invention as resin-rich coatings or, depending upon the type and size structure, they may be incorporated directly into the original polyester resin-aggregate mix. For example, wax may be added directly to the polyester resin-aggregate mixture as it is mixed to produce a moisture barrier protecting the uncured or raw mixture from high atmospheric humidity if the composition is exposed to air during the curing period. Applicable waxes are the paraffin waxes as well as higher fatty acid esters. The natural occurring waxes such as carnauba and montan wax are applicable additives for the compositions of this invention.

With specific reference to the construction materials of this invention for use in preparing electrolytic cell parts, (either tops, bottoms or other concrete components, the aggregate found to be most advantageous is a mixture of sand and granite gravel. The preferred ratio of sand to granite is 25 percent:75 percent on a weight basis. Silica pebbles and No. 5 granite are representative of granite gravel. The aggregate mixture employed is one in which all will pass a half inch screen, one half will pass a 0.083-inch screen and 25 percent will pass a 0.023-inch screen. The presence of an excessive amount of extreme fines, particles smaller than 0.01 inch in diameter, are preferably avoided. The actual screen analysis for aggregate which has been successfully used to cast an electrolytic cell top of the Hooker-S type which consisted of 25 percent (by weight) sand; 40 percent (by weight) silica pebbles and 35 percent (by weight) No. 5 granite was obtained after drying the aggregate at 110 degrees centigrade in an oven overnight.

TABLE I

Typical Screen Analysis of Aggregate Mix (Dried)

| Screen mesh size | Screen size (in inches) | Weight percent passing through |
|---|---|---|
| ⅜ | 0.3710 | 95.17 |
| 4 | 0.1850 | 67.17 |
| 10 | 0.0650 | 44.52 |
| 30 | 0.0232 | 27.57 |
| 50 | 0.0116 | 1.72 |
| 100 | 0.0058 | 0.05 |

The moisture content of the aggregate was determined by drying weighed portions of each aggregate component in an oven at 110 degrees centigrade overnight and determining the weight loss.

TABLE II

Weight percent water in aggregate components

| Aggregate component: | Weight percent moisture |
|---|---|
| Sand | 1.04 |
| Silica pebbles | 1.58 |
| No. 5 granite | 0.54 |
| 40 percent gravel, 35 percent granite, 25 percent sand mix | 0.92 |

The silica pebbles when dried has a screen analysis as follows:

TABLE III

Screen Analysis of Silica Pebbles (Dried)

| Mesh size | Screen size (in inches) | Weight percent passing through |
|---|---|---|
| ⅜ | 0.3710 | 98.60 |
| 4 | 0.1850 | 81.70 |
| 10 | 0.0650 | 57.43 |
| 30 | 0.0232 | 22.82 |
| 50 | 0.0116 | 4.99 |
| 100 | 0.0058 | 0.69 |

TABLE IV

Screen analysis of No. 5 granite (dry)

| Screen size (in inches): | Weight percent passing through |
|---|---|
| 0.5 | 100 |
| 0.375 | 81 |
| 0.25 | 55 |
| 0.125 | 8 |

The compressive strength of the polyester resin-aggregate composition was determined by casting several batches of mix containing from 10 to 20 percent by weight of Resin B with dried aggregate in the ratio of 25 percent sand, 40 percent silica pebbles and 35 percent No. 5 granite into a lined cardboard cylinder 7½ inches high and 2¾ inches in diameter. The mix was then vibrated with an electric stirring motor to produce a uniform aggregate distribution and a resin rich surface with reduced number of voids caused by entrained air bubbles. Each test cylinder was cured in air for several days and then subjected to the standard ASTM compression test for concrete.

Several additional test cylinders were compounded and cast which contained various amounts of water. After curing at ambient temperature for several days, these samples were broken and the compressive strengths recorded in Table V.

TABLE V

Compressive Strength Determinations for Various Hetron-Aggregate Mixes

| Sample formulation | Compressive strength in pounds per sq. inch |
|---|---|
| 20% Resin B, 80% dry aggregate (40 silica pebbles, 35% No. 5 granite, 25 sand) | 5,421 |
| 15% Resin B, 85% dry aggregate (40% silica pebbles, 35% No. 5 granite, 25% sand) | 6,568 |
| 10% Rresin B, 90% dry aggregate (40% silica pebbles, 35% No. 5 granite, 25% sand) | 4,406 |
| 15% Resin B, 1% Triton X-102, 84% dry aggregate (40% silica pebbles, 35% No. 5 granite, 25% sand) | 5,420 |
| 15% Resin B, 1% water, 1% Triton X-102, 83% dry aggregate (40% silica pebbles, 35% No. 5 granite, 25% sand) | 5,203 |
| 15% Resin B, 5% water, 0.5% Triton X-102, 79.5% dry aggregate (40% silica pebbles, 35% No. 5 granite, 25% sand) | 2,82 |

From this data it may be seen that the presence of moisture in excess of 1 percent may lower the compressive strength of the polyester-aggregate concrete. Also, a problem of porosity which is generally a function of the degree of compaction of the resin-aggregate mixture is controllable through adequate vibrational compacting of the resin-aggregate mixture and by control of the amount of moisture present in the aggregate. Hence, the aggregate employed may contain between 0 and 4 percent moisture by weight and preferably between 0.5 and 1.5 percent by weight water.

The polyester-aggregate concrete type preparation of this invention achieves its service strength much more rapidly than conventional concrete produced from cement and aggregate. Very strong concrete type structures may be rapidly produced by post curing the polyester-aggregate compositions of this invention at 130° C. to consistently achieve compressive strengths in the order of 13,000 pounds per square inch and above. Table VI illustrates the increase in compressive strength of a specific formulation comprising 15% Resin B, 84.5% aggregate (40% silica pebbles, 35% No. 5 granite, 25% sand), 0.5 Triton X-102 with methyl ethyl ketone peroxide as the catalyst and cobalt naphthenate accelerator. The product was conventionally dry cured with no post curing.

TABLE VI

| Time in days: | Compressive strength, pounds per square inch |
|---|---|
| 1 | 7260 |
| 3 | 7450 |
| 10 | 7430 |
| 51 | 9844 |

The polyester resin-aggregate concrete of this invention may be utilized in the construciton of any structure which is exposed to acidically corrosive materials as well as such corrosive materials as sea water. The accompanying drawings illustrate several ramifications of the instant invention.

Figure 1:
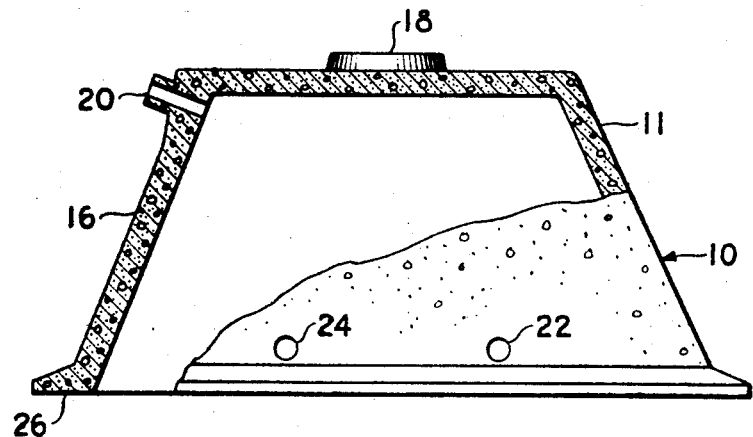
FIG. 1 is a side elevation of a typical electrolytic cell, shown disassembled, in which the subject of this invention has been included.
Figure 1:
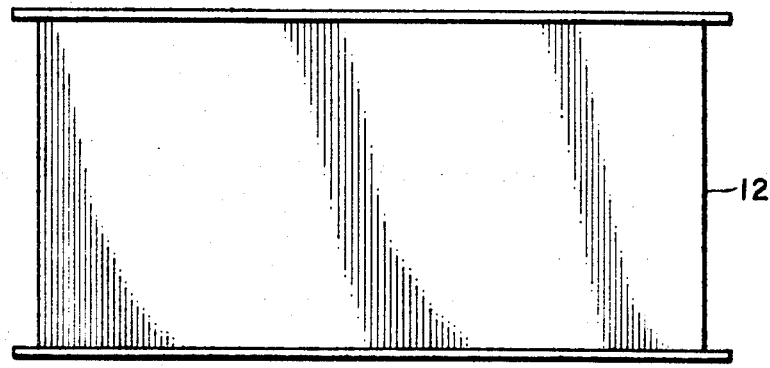
Figure 1:
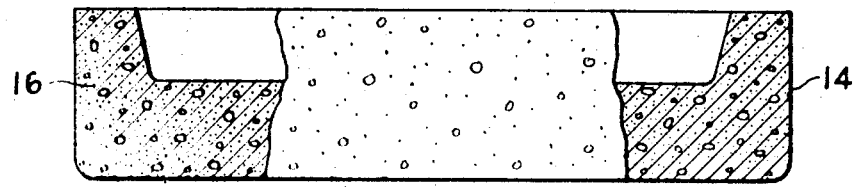

An electrolytic cell for the electrolysis of brine, chlorate, perchlorate, hydrochloric acid and the like, may be composed of several concrete parts. FIG. 1 shows a typical electrolytic cell 10 in its several parts, having a cell top 11, a metallic cathode 12 and a cell bottom 14. The cell top 11 and cell bottom 14 consist of concrete prepared from the resin-aggregate composition 16 of this invention. The cell top 11 contains a chlorine outlet 18, a brine feed inlet 20, a sight glass opening 24 and an anolyte overflow outlet 22. When assembled, the cell 10 has the cathode 12 resting on the cell bottom 14 and the cell top 11 rests on the cathode 12. The anolyte overflow outlet 22 is adapted to receive an anolyte liquid level control device which permits the continuous removal of anolyte as when the electrolytic cell is operated with recirculated acidified anolyte whereby a constantly refreshed brine feed is introduced into the cell through opening 20 at a rate more rapid than it will flow through the diaphragm. It is understood that although both the cell top 11 and cell bottom 14 are described herein as being produced from the resin-aggregate composition of this invention, just the cell top or just the cell bottom may be constructed from the resin-aggregate concrete while the other cell components may be built from conventional structural materials known to the art. The cell component which is exposed in operation to a highly corrosive acidic material is rendered relatively corrosion resistant when formed from the resin-aggregate composition of the instant invention in comparison to the same cell part constructed from conventional material such as concrete produced with the cement normally employed in the art. Furthermore, it is to be understood that although the cell structures are depicted without reinforcing members, the presence of such members, in stressed or unstressed condition does not depart from the scope of the instant invention although it is preferred to omit such members for economic reasons.

Figure 2:
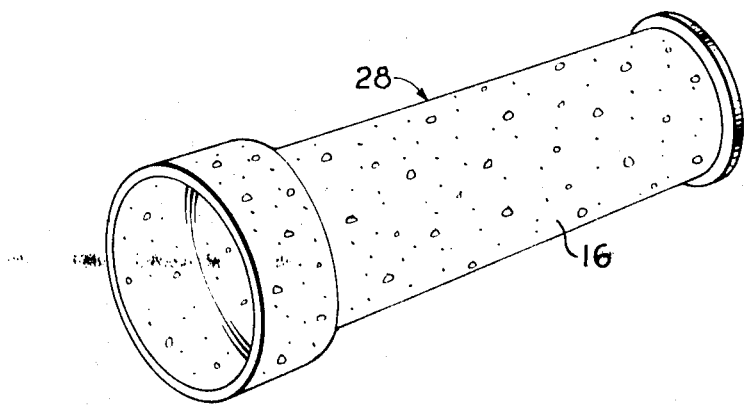
FIG. 2 is a view of a typical pipe section in which the subject of this invention has been included.

In many instances, piping employed to convey acidic or highly corrosive materials such as brines present unique problems of stability. The pipe section 28 depicted in FIG. 2 is formed by conventional methods from the resin-aggregate composition 16 of the instant invention. Other pipe structures for use in the adverse environment described in this application may also advantageously be formed from the corrosion resistant material of this invention. As shown, the standard pipe section is of the bell (enlarged end) and socket (rimmed end) type. This type of pipe is joined to another section by inserting the socket of one section into the bell end of another section, the joint being sealed with an impervious sealing material known to the art.

Figure 3:
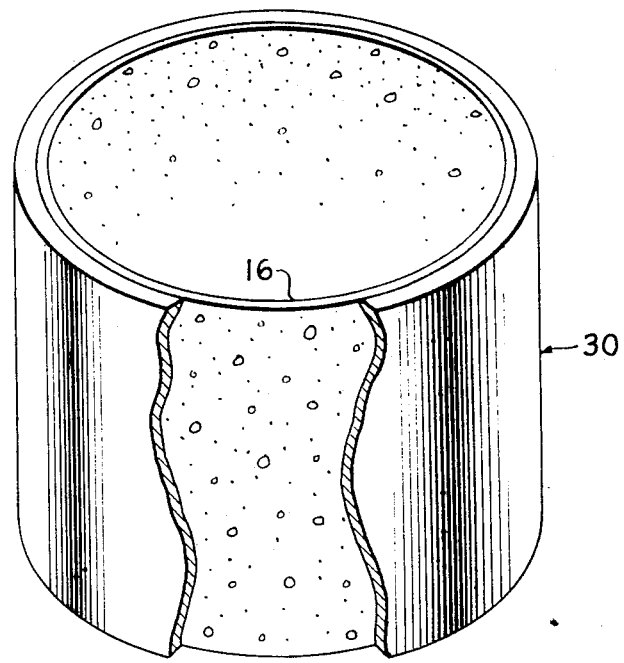
FIG. 3 is a partial sectional view of a tank lined with the subject of this invention.

Tanks and vessels used to contain corrosive materials may be constructed entirely of the resin-aggregate compositions of the instant invention or they may be built of conventional materials and lined with preformed liners or those produced specifically for the subject tank. FIG. 3 illustrates the use of a liner formed from the resin-aggregate material of this invention in which the body of the tank 30 may be of concrete or steel while the liner 16 is disposed in such manner as to completely line the inner wall of the tank.

With specific reference to diaphragm type chlor-alkali electrolytic cell construction, concrete cell tops are short lived particularly in large cells which operate under conditions involving the recirculation of acid anolyte. To reduce the corrosion of the concrete cell top which is constantly attacked by chlorine containing NaCl solutions and other acidic components within the anolyte chamber, various liners such as polyvinyl chloride, afterchlorinated polyvinyl chloride, polyvinylidene chloride either plasticized or non-plasticized have been employed. The construction material of this invention avoids the necessity of employing such liner materials while affording the desired protection and long life of the cell top.

The polyester, described in detail above, is filled with aggregate and cast in a mold in the same manner as concrete parts are produced. The preferred polyester for electrolytic cell construction is Resin B filled with aggregate to afford a mixture of about 85 percent aggregate and 15 percent resin. The particle size distribution of aggregate is the theoretical particle size distribution considered best for concrete. No reinforcing steel is required in diaphragm chlor-alkali cell tops made from this material. Likewise, inserts are not required in the openings for the brine feed, chlorine outlet or slight glass because the cell part may be simply cast with the openings in it. Conventionally, with concrete cell tops, the openings are lined with hard rubber or ceramic inserts.

EXAMPLE 1

An electrolytic cell top for a chlor-alkali cell was prepared with a form lined with polyvinyl alcohol constructed as a mold for an electrolytic cell top, split midway along its horizontal axis in order to facilitate the distribution of the wet mix and to prevent the formation of large air pockets. The inner mold was anchored to a large wooden platform 8 feet by 8 feet which had been leveled. The solid aggregate of Table VII was placed in a cement mixer. Liquid resin B, to which had been added and mixed seriatim the Triton X–100, cobalt accelerator and Lupersol DDM (60 percent methyl ethyl ketone peroxide in dimethyl phthalate), was introduced and the premix was thoroughly mixed. The polyester resin-aggregate mixture was poured into the forms and a vibrator clamped to the side ribs of each outer mold was activated. The vibrator was periodically moved to insure a uniform application. The vibrator serves to eliminate large air pockets in the aggregate-resin mix and to produce a resin rich surface on the ultimate molding. A resin rich surface is very desirable in most applications where the final structure is to be exposed to a corrosive media. When the lower portion of the mold was substantially filled, the upper portion was placed in position, bolted, and the filling procedure continued.

During the casting of the cell top, the ambient temperature was 79 degrees Fahrenheit and adequate ventilation was provided. The cell top was allowed to cure for 24 hours at which time the mold was removed. The bottom "flange" surfaces were then painted with an epoxy resin and a 10-mil sheet of Teflon (perfluoropolyethylene) film was cut and glued to the flange surface of the cell top, to resist any corrosion from the caustic encountered around the top of the cathode due to the cell liquid which penetrates the asbestos paper used to line the flange area of the cathode.

A total of 1175 pounds of material were required to complete the cell top. The cell top required a volume of approximately 8.84 cubic feet of mix to fill the form. Although the pot life of this formulation was about six hours, the handling properties of the resin-aggregate mix were similar to those of regular concrete. By varying the amount of cobalt accelerator and catalyst in the mix, it was possible to extend or shorten the useful pot life of the material. However, if an insufficient amount of these materials is present, the peak isotherm of the resin mix will not be reached, thus producing a weak structure. Yet if a large excess of accelerator and catalyst is employed in the formulation, the resin mix will crack and craze during the curing period, again producing a very weak material. The top walls and top of the casting were two inches thick, while the flange area was wider and thicker in order to provide sufficient contact surface at the cathode interface.

The completed cell top was installed on an operating electrolytic cell. After nine months of normal recirculated acid anolyte operation, the top was removed and examined; but no signs of leakage or corrosion were observed.

TABLE VII

Composition of resin-aggregate mix used to cast a cell top

| Component | Amount |
| --- | --- |
| Resin B | pounds__ 240 |
| Cobalt naphthenate accelerator (6 percent cobalt solution in mineral spirits) | mls.__ 407 |
| Methyl ethyl ketone peroxide | mls__ 596 |
| Triton X–100 | pounds__ 3 |
| Silica pebbles | do____ 524 |
| No. 5 red granite | do____ 458 |
| Sand | do____ 327 |

This mix provides about 1555 pounds of material which is sufficient to form a cell top two inches in thickness.

EXAMPLE 2

To further determine the suitability of the resin-aggregate mixture disclosed in Table VII for construction of electrolytic cell tops, a lifting lug break test was performed as follows:

Two 29-pound batches of the resin-aggregate formulation of Table VII were consecutively mixed; and each was poured into a wooden form lined with polyvinyl alcohol having the following dimensions: 20 inches long by 20 inches wide by 2 inches high. Between batches, a 1/16-inch diameter iron wire reinforcing screen (2 inch mesh) was placed in the middle of the form at the batch interface. A steel lifting lug formed from a ½ inch diameter rod had been welded to the middle of the screen by "tacking" the 1¼ inch long feet of the lug directly to the wire. The second batch of resin and aggregate was then poured directly over the wire some 40 minutes later. This material filled the mold to a height of 1⅞ inches and buried the lug "feet" under approximately 11/16 inch of wet mix.

After ambient curing for two days, the metal lifting "eye" was connected to the chain hoist which had been adapted with a suitable spring scale. The cured block was then evenly braced around all four sides of the top surface with a steel beam collar which had been constructed for this purpose. By using vertical sections of steel pipe, the collar was braced against the overhead hoist, thus holding the block firmly against the floor while the lifting force was applied. In this manner, a force of 5700 pounds was sustained with no apparent difficulty for about ten minutes. When the lifting force was increased to approximately 6200 pounds, the lug pulled out of the block breaking only the surface area surrounding the lifting loop.

EXAMPLE 3

To further determine the applicability of the resin-aggregate mixture of Table VII as a construction material for electrolytic cell tops in which the cell is operated under conditions of recirculated acidified anolyte, samples of the resin-aggregate mix were continuously exposed to acid brine having a pH of 1.5 at 90 degrees centigrade for 12 days. At the end of this period, no weight or volume change could be detected and the hardness and compressive strength of the specimens were unaffected.

One sample of the resin-aggregate mixture was alternately heated in boiling water and quenched in ice water (4 cycles). The strength of the material was not changed by this thermal shock treatment.

EXAMPLE 4

To determine the comparative chemical resistance and compressive strength retention properties of resin bound aggregates of the invention and similarly prepared aggregates containing resins derived from glycols other than lower-alkylene neo-glycols, resin bound aggregates were prepared using 15% by weight of the resin identified below
1.6 pounds of silica pebbles
1.4 pounds of red granite
1.0 pound of white sand.

The concrete aggregates were cast in 2 x 4 inch cylinders in accordance with the procedure set out in ASTM C-192-68.

The three resins used were Resin B prepared as described above. Resin I which was the polyester resin comprised of about 0.5 mole fraction of chlorendic acid, fumaric and adipic acid and about 0.5 mole fraction of ethylene glycol in about 35 parts of styrene per one hundred parts of resin, and Resin J which was the polyester resin comprised of about 0.5 mole fraction of chlorendic and fumaric acids and about 0.5 mole fraction of ethylene glycol and diethylene glycol containing from about 0.5 to 3.5 percent of SiO₂ to provide a thixotropic composition with about 45 parts of styrene per one hundred parts of resin and about one percent of dimethylaniline, as promoter, and about 0.5 percent of cobalt naphthenate, as accelerator.

The original weight, volume, hardness, and compressive strength of the cylinders were determined and thereafter the cast cylinders from each of the above resin bound aggregates were fully immersed in an aqueous solution containing 4.5 to 5 percent of sodium hypochlorite at 50 degrees centigrade. The cylinders were held in the test solution for 50 days, the solution being replenished daily.

After the 50-day period of exposure the cylinders were removed and again tested for weight, volume, hardness, and compressive strength.

The data obtained from this test are set out in the following table.

TABLE

| Resin | Weight charge, percent | Volume charge, percent | Hardness retention, percent | Compression strength retention, percent | Remarks |
|---|---|---|---|---|---|
| B | −3.3 | −3.9 | 70.0 | 70.0 | (B) Good—Slight attack, some loose sand on surface. |
| I | −9.9 | −4.3 | 0 | 6.7 | (I) Poor—Severe attack of resin. |
| J | +5.3 | +21.3 | 0 | 3.6 | (J) Poor—Severe resin attack and swelling. |

Legend: +=gain; −=loss; 0=no change.

These data clearly indicate that the resin aggregates containing resins derived from a lower alkylene neoglycol exhibit surprisingly superior chemical resistance and strength retention to the hypochlorite environment than do the aggregates bound with prior art resins which are derived from ethylene glycol and/or diethylene glycol.

Having disclosed the invention, it will be apparent to those of average skill in the art that the corrosion resistant compositions of this invention are applicable in diverse structural applications which do not depart from the true spirit of this contribution.

What is claimed is:
1. A polyester resin-aggregate comprising:
   (a) 10 to 40 percent by weight of a mixture of
      (1) an unsaturated polyester resin of components consisting essentially of an unsaturated dicarboxylic acid, a glycol, and a component of the formula

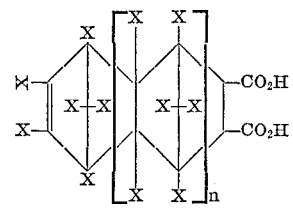

wherein X is a halogen selected from the group consisting of chlorine and bromine and $n$ is from 0 to 5 and wherein said glycol consists essentially of a lower alkylene neoglycol,
      (2) an unsaturated cross-linking agent, and
   (b) from 60 to 90 percent by weight of substantially siliceous aggregate of such size that less than 2 percent passes a 0.0116-inch screen.
2. The composition of claim 1 in which the unsaturated dicarboxylic acid is selected from the group consisting of maleic acid and fumaric acid.
3. The composition of claim 1 in which the polyester resin is of components comprising 1,4,5,6,7,7-hexachlorobicyclo - (2.2.1) - hept - 5 - ene - 2,3 - dicarboxylic acid, maleic anhydride and a lower alkylene neo-glycol.
4. The composition of claim 3 in which the lower alkylene neo glycol is neopentyl glycol.
5. The composition of claim 1 in which the polyester resin is of components comprising 1,4,5,6,7,7-hexachlorobicyclo (2.2.1)-hept-5-ene-2,3-dicarboxylic acid, fumaric acid and a lower alkylene neo glycol.
6. The composition of claim 5 in which the lower alkylene neo glycol is neopentyl glycol.
7. The composition of claim 1 in which the polyester resin is of components comprising 1,4,5,6,7,7-hexachlorobicyclo-(2.2.1)-hept-5-ene-2,3-dicarboxylic acid, fumaric acid and a lower alkylene neo glycol.
8. A rigid cured resinous article comprising a composition containing
   (a) from 10 to 40 percent by weight of the reaction of an ethylenically unsaturated polyester resin of components consisting essentialy of an unsaturated dicarboxylic acid, a glycol and a compound of the formula

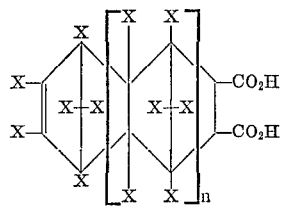

wherein X is a halogen selected from the group consisting of chlorine and bromine and $n$ is from 0 to 5, and wherein said glycol consists essentially of a lower alkylene neo-glycol and a polymerizable vinyl monomer and (b) from 60 to 90 percent by weight water insoluble siliceous aggregate of such size that less than 2 percent passes a 0.0116-inch screen, said article having a surface which is substantially inert toward acidic fluids.

9. The article of claim 8 in which said ethylenically unsaturated polyester resin is the polymerization product of chlorendic acid, maleic anhydride and neopentyl glycol.

10. The article of claim 8 in which said ethylenically unsaturated polyester resin is the polymerization product of chlorendic acid, fumaric acid, and neopentyl glycol.

11. The article of claim 8 containing a minor effective amount of an anti-fouling agent.

12. An electrolytic cell component comprising a rigid, cast body of from 10 to 40 percent by weight of the reaction product of an ethylenically unsaturated polyester resin and a polymerizable vinyl monomer and from 60 to 90 percent water insoluble siliceous aggregate of such size that less than 2 percent passes a 0.0116-inch screen, said cell part having a resin rich surface and being substantially inert toward acidic corrosion, wherein said polyester resin is of components consisting essentially of an unsaturated dicarboxylic acid, a glycol, and a compound of the formula

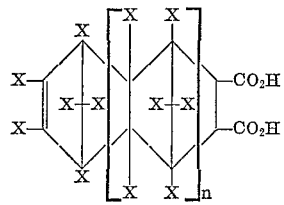

wherein X is a halogen of the group consisting of chlorine and bromine, $n$ is from 0 to 5 and wherein said glycol consists essentially of a lower alkylene neoglycol.

13. A corrosion resistant tank comprising a tank bottom and tank walls exposing at the internal surfaces of said tank a concrete material resistant toward corrosion, said concrete material comprising a polyester resin aggregate composition composed of (A) from 10 to 40 percent by weight of a mixture of (1) an unsaturated polyester resin of components consisting essentially of an unsaturated dicarboxylic acid and a glycol, and a compound of the formula

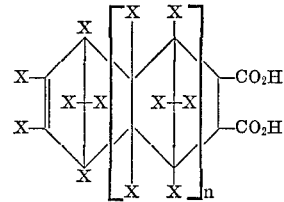

wherein $n$ is from 0 to 5 and X is a halogen selected from the group consisting of chlorine and bromine, wherein said glycol consists essentially of a lower alkylene neo-glycol, and (2) an unsaturated cross-linking agent and (B) from 60 to 90 percent by weight of substantially siliceous aggregate of such size that less than 2 percent passes a 0.0116-inch screen.

14. A corrosion resistant pipe for the transportation of corrosive materials comprising a tubular conduit adapted to be joined to another pipe section, said conduit exposing an external surface of a concrete material resistant toward corrosion, said concrete material comprising a polyester resin aggregate composition composed of (A) from 10 to 40 percent by weight of a mixture of (1) an unsaturated polyester resin of components consisting essentially of an unsaturated dicarboxylic acid and a glycol and a compound of the formula

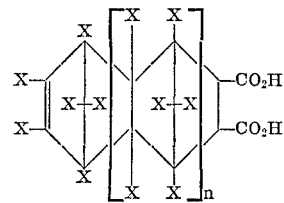

wherein $n$ is from 0 to 5 and X is a halogen selected from the group consisting of chlorine and bromine, and wherein said glycol consists essentially of a lower alkylene neoglycol, and (2) an unsaturated cross-linking agent and (B) from 60 to 90 percent by weight of substantially siliceous aggregate of such size that less than 2 percent passes a 0.0116-inch screen.

References Cited

UNITED STATES PATENTS

| 3,320,336 | 5/1967 | Duke et al. | 260—75 UA X |
|---|---|---|---|
| 3,326,845 | 6/1967 | Arens et al. | 260—40 R |
| 2,779,701 | 1/1957 | Robitschek et al. | 260—869 X |
| 3,078,249 | 2/1963 | Russell | 260—40 R |

OTHER REFERENCES

Bjorksten: Polyesters and their Applications (1956) TP986.P6 B5 pp. 158-9, 161, 179, 182-5.

ALLAN LIEBERMAN, Primary Examiner

S. M. PERSON, Assistant Examiner

U.S. Cl. X.R.

204—279; 260—75 UA, 861, 869

PO-1050
(5/69)

UNITED STATES PATENT OFFICE
CERTIFICATE OF CORRECTION

Patent No. 3,763,083          Dated October 2, 1973

Inventor(s)    Morris P. Grotheer

It is certified that error appears in the above-identified patent and that said Letters Patent are hereby corrected as shown below:

Column 2, line 17, "is" should read ---its---; line 51, "instance" should read ---instant---. Column 3, line 57, "useful" should read ---used---. Column 7, line 63, after "25" insert ---%---; line 65, "Rresin" should read ---Resin---; line 70, "2,82" should read ---2,828---. Column 9, line 53, "slight" should read ---sight. Column 10, line 16, "liquid" should read ---liquor---.

Signed and sealed this 19th day of February 1974.

(SEAL)
Attest:

EDWARD M. FLETCHER, JR.      C. MARSHALL DANN
Attesting Officer              Commissioner of Patents